(12) United States Patent
Cheng et al.

(10) Patent No.: US 8,872,802 B2
(45) Date of Patent: Oct. 28, 2014

(54) OPTICAL TOUCH MODULE AND RELATED METHOD OF ROTARY ANGLE ADJUSTMENT

(75) Inventors: Kai-Chung Cheng, New Taipei (TW); Yu-Yen Chen, New Taipei (TW); Lin-Husng Chang, New Taipei (TW); Po-Liang Huang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 285 days.

(21) Appl. No.: 13/592,366

(22) Filed: Aug. 23, 2012

(65) Prior Publication Data
US 2013/0141392 A1    Jun. 6, 2013

(30) Foreign Application Priority Data

Dec. 2, 2011   (TW) .............................. 100144347 A
Apr. 5, 2012   (TW) .............................. 101112047 A

(51) Int. Cl.
    *G06F 3/042*    (2006.01)
(52) U.S. Cl.
    USPC .......................... 345/175; 345/173; 178/18.09
(58) Field of Classification Search
    USPC ...................... 345/173–178; 178/18.01–18.11
    See application file for complete search history.

(56) References Cited

U.S. PATENT DOCUMENTS

| | | | | |
|---|---|---|---|---|
| 4,558,313 A | * | 12/1985 | Garwin et al. | 345/179 |
| 4,642,422 A | * | 2/1987 | Garwin et al. | 178/18.02 |
| 5,283,396 A | * | 2/1994 | Donner et al. | 178/18.02 |
| 6,414,673 B1 | * | 7/2002 | Wood et al. | 345/173 |
| 6,563,491 B1 | * | 5/2003 | Omura | 345/173 |
| 8,243,047 B2 | * | 8/2012 | Chiang et al. | 345/175 |
| 2010/0079412 A1 | * | 4/2010 | Chiang et al. | 345/175 |
| 2011/0084938 A1 | * | 4/2011 | Wang | 345/175 |
| 2012/0044213 A1 | * | 2/2012 | Lu et al. | 345/175 |
| 2012/0146949 A1 | * | 6/2012 | Chen | 345/175 |
| 2012/0249480 A1 | * | 10/2012 | Keenan et al. | 345/175 |
| 2012/0306820 A1 | * | 12/2012 | Yu | 345/175 |
| 2013/0141389 A1 | * | 6/2013 | Chou et al. | 345/175 |

* cited by examiner

*Primary Examiner* — Dmitriy Bolotin
(74) *Attorney, Agent, or Firm* — Winston Hsu; Scott Margo

(57) ABSTRACT

A method of adjusting a rotary angle of an optical touch module is disclosed in the present invention. The method includes measuring a length and a width of a panel; measuring a first moving distance and a second moving distance of a sensor of the optical touch module as moving from the first position to the second position; calculating a first projecting distance and a second projecting distance of the sensor at the first position according to the length and width of the panel; calculating a first angle and a second angle of the sensor at the second position according to the first moving distance, the second moving distance, the first projecting distance and the second projecting distance; and calculating the rotary angle of the sensor that moves from the first position to the second position according to the first angle and the second angle.

25 Claims, 7 Drawing Sheets

OPTICAL TOUCH MODULE AND RELATED METHOD OF ROTARY ANGLE ADJUSTMENT

BACKGROUND OF THE INVENTION

1. Field of the Invention

The present invention relates to an optical touch module, and more particularly, to a detachable optical touch module and a related method of adjusting a horizontal rotary angle and a vertical rotary angle of a sensor after assembly.

2. Description of the Prior Art

In general, a conventional optical touch module utilizes a light interruption method or a direct image capturing method to detect a position of a user's finger on a touch surface. Both of the two methods utilize two (or three) image capturing devices and a near-infrared light emitting device. The said two image capturing devices are usually disposed at upper-left and upper-right corners of a touch screen, respectively. The difference between the two methods is that the light interruption method utilizes a background lighting design, in which a reflective bar or a near-infrared light emitting bar is disposed around the touch screen. In the light interruption method, a user's finger is taken as an interruption object for partially interrupting light, which is emitted from the reflective bar or the near-infrared light emitting bar, when touching the touch screen. At this time, a position of the user's finger on the touch screen can be calculated accordingly by utilizing the said image capturing devices to capture related optical images and then performing corresponding image processing. On the other hand, the direct image capturing method utilizes a near-infrared light emitting device to illuminate a user's finger directly instead of the said background lighting design. Subsequently, a position of the user's finger on the touch screen can also be calculated by utilizing the said image capturing devices to capture related optical images and then performing corresponding image processing. Therefore, the image capturing device of the conventional optical touch module has to completely cover the touch surface for obtaining the better view range.

Please refer to FIG. 1. FIG. 1 is a diagram of an optical touch module 10 and a panel 12 in the prior art. The optical touch module 10 is disposed on a corner of the panel 12, and a central line of the optical touch module 10 is equally dividing the view range of the optical touch module 10, which means angles between the central line and the adjacent edges of the panel 12 are 45 degrees respectively, so that the view range of the optical touch module 10 fully covers the panel 12. However, in order to match with the circuit design and mechanical design, a position of the conventional optical touch module 10 is varied according to design demand, and the view range of the conventional optical touch module 10 deviates from the predetermined view angle, which means the varied view range does not fully cover the panel 12. As the figures is put on a boundary of the panel 12, the boundary may exceed the view range of the optical touch module 10, and the optical touch module 10 loses control of touch detection accuracy. Thus, design of an adjustment of the optical touch module is an important issue of the optical touch industry.

SUMMARY OF THE INVENTION

The present invention provides a detachable optical touch module and a related method of adjusting a horizontal rotary angle and a vertical rotary angle of a sensor after assembly for solving above drawbacks.

According to the claimed invention, a method of adjusting a horizontal rotary angle of an optical touch module is disclosed. The optical touch module includes a sensor and a panel. The method is capable of rotary adjusting the sensor which moves relative to the panel from a first position to a second position. The method includes measuring a length and a width of the panel, measuring a first moving distance and a second moving distance of the sensor when the sensor moves from the first position to the second position, calculating a first projecting distance and a second projecting distance of the sensor according to the length and width of the panel when the sensor is at the first position, calculating a first angle and a second angle of the sensor according to the first moving distance, the second moving distance, the first projecting distance and the second projecting distance when the sensor is at the second position, and calculating the horizontal rotary angle of the sensor when the sensor moves from the first position to the second position according to the first angle and the second angle. The first moving distance is along a first direction and the second moving distance is along a second direction different from the first direction. The projecting distances is respectively between the first position and adjacent corners of the panel. The angles are respectively between the second position and the adjacent corners of the panel.

According to the claimed invention, the method further includes rotating the sensor about the horizontal rotary angle, so that a view range of the sensor at the second position covers whole area on the panel.

According to the claimed invention, an angle between a central line of the sensor and an adjacent edge of the panel is substantially equal to 45 degrees when the sensor is at the first position, and the central line is substantially parallel to a reference line of the panel.

According to the claimed invention, angles between the central line of the sensor and the adjacent corners of the panel are substantially equal to the first angle and the second angle when the sensor is at the second position and is not rotated about the horizontal rotary angle.

According to the claimed invention, the first direction is substantially parallel to the reference line, and the second direction is substantially perpendicular to the reference line.

According to the claimed invention, calculating the first projecting distance and the second projecting distance of the sensor at the first position relative to the adjacent corners of the panel includes: calculating the first projecting distance and the second projecting distance by respectively dividing the length and the width into $\sqrt{2}$ according to an isosceles right triangle formula.

According to the claimed invention, the first angle is substantially equal to a tetrahedral angle of a first ratio, and a sum of adding the first projecting distance and the second moving distance divided by a sum of adding the first moving distance and the first projecting distance substantially equals the first ratio.

According to the claimed invention, the second angle is substantially equal to a tetrahedral angle of a second ratio, and a sum of subtracting the second moving distance from the second projecting distance divided by a sum of adding the first moving distance and the second projecting distance substantially equals the second ratio.

According to the claimed invention, the horizontal rotary angle is substantially equal to a half of a sum of subtracting the second angle from the first angle.

According to the claimed invention, horizontal rotation of the sensor is adjusted according to a first table composed of the first moving distance, the second moving distance and the horizontal rotary angle.

According to the claimed invention, a method of adjusting the horizontal rotary angle and the vertical rotary angle of the optical touch module is disclosed. The optical touch module includes the sensor and the panel. The method is capable of rotary adjusting the sensor which moves relative to the panel from the first position to the second position in horizontal and rotary adjusting the sensor relative to a bar in vertical. The method includes measuring the length and the width of the panel, measuring the sensor height of the sensor and the bar height of the bar applied to the optical touch module, measuring the first moving distance and the second moving distance of the sensor when the sensor moves from the first position to the second position, measuring the gap distance between the sensor and the bar, calculating the first projecting distance and the second projecting distance of the sensor according to the length and width of the panel when the sensor is at the first position, calculating the first angle and the second angle of the sensor according to the first moving distance, the second moving distance, the first projecting distance and the second projecting distance when the sensor is at the second position, calculating the horizontal rotary angle of the sensor when the sensor moves from the first position to the second position according to the first angle and the second angle, and calculating the vertical rotary angle of the sensor for matching the bar according to the gap distance and a difference between the sensor height and the bar height. The first moving distance is along the first direction and the second moving distance is along the second direction different from the first direction. The projecting distances is respectively between the first position and adjacent corners of the panel. The angles are respectively between the second position and the adjacent corners of the panel.

According to the claimed invention, the method further includes rotating the sensor about the vertical rotary angle, so that a sensing center of the sensor aligns with a central position of the bar.

According to the claimed invention, calculating the vertical rotary angle of the sensor for matching the bar includes: calculating a difference between a sensing center of the sensor and a central position of the bar.

According to the claimed invention, the vertical rotary angle is substantially equal to a tetrahedral angle of a third ratio, and a difference between a sensing center of the sensor and a central position of the bar divided by the gap distance substantially equals the third ratio.

According to the claimed invention, vertical rotation of the sensor is adjusted according to a second table composed of the sensor height, the bar height, the gap distance and the vertical rotary angle.

According to the claimed invention, an optical touch module capable of adjusting rotary angles is disclosed. The optical touch module includes a panel, a sensor and a controller. A detecting area is set on a surface of the panel. The panel includes a reference line, an angle between the reference line and an adjacent edge of the panel is substantially equal to 45 degrees. The sensor is disposed by a side of a corner of the panel for capturing an optical signal from an object. An angle between the reference line and a central line of the sensor equals a horizontal rotary angle according to a first table. An angle between the sensor and the panel equals a vertical rotary angle according to a second table, so that a view range of the sensor covers whole area on the panel. The controller is electrically connected to the sensor for determining a coordinates value of the object located inside the detecting area according to the optical signal captured by the sensor.

According to the claimed invention, the optical touch module further includes a bar disposed on an edge of the panel opposite to the sensor, and the bar absorbs or reflects the optical signal from the sensor.

According to the claimed invention, the optical touch module further includes two sensors respectively disposed on by sides of two adjacent corners of the panel. An angle between the reference line and a central line of each sensor is substantially equal to the horizontal rotary angle according to the first table, and an angle between the sensor and the panel is substantially equal to the vertical rotary angle according to the second table.

The present invention includes the method of adjusting the horizontal rotary angle and the vertical rotary angle of the sensor, so as to vary the view range of the sensor which moves away from the initial state. The present invention can utilize the length and the width of the panel, and the moving distances of the sensor to generate the first table, and further utilize the sensor height, the bar height and the gap distance to generate the second table by the above-mentioned horizontal adjustment method and the above-mentioned vertical adjustment method. Therefore, the user can easily adjust the horizontal rotary angle and the vertical rotary angle of the sensor according to the first table and the second table, so that the view range of the sensor of the optical touch module can fully cover the whole area on the panel, to effectively enhance the product quality and the manufacturing yield of the optical touch module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
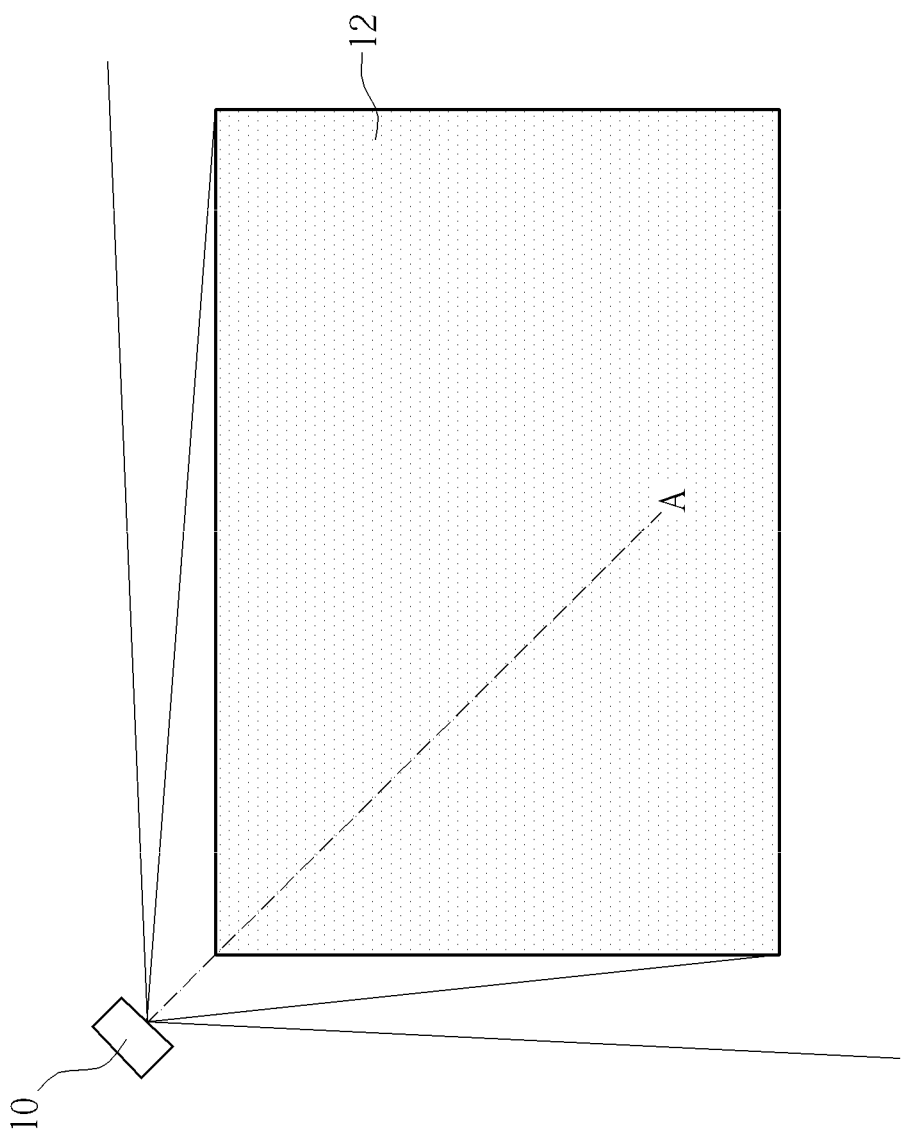
FIG. 1 is a diagram of an optical touch module and a panel in the prior art.
Figure 2:
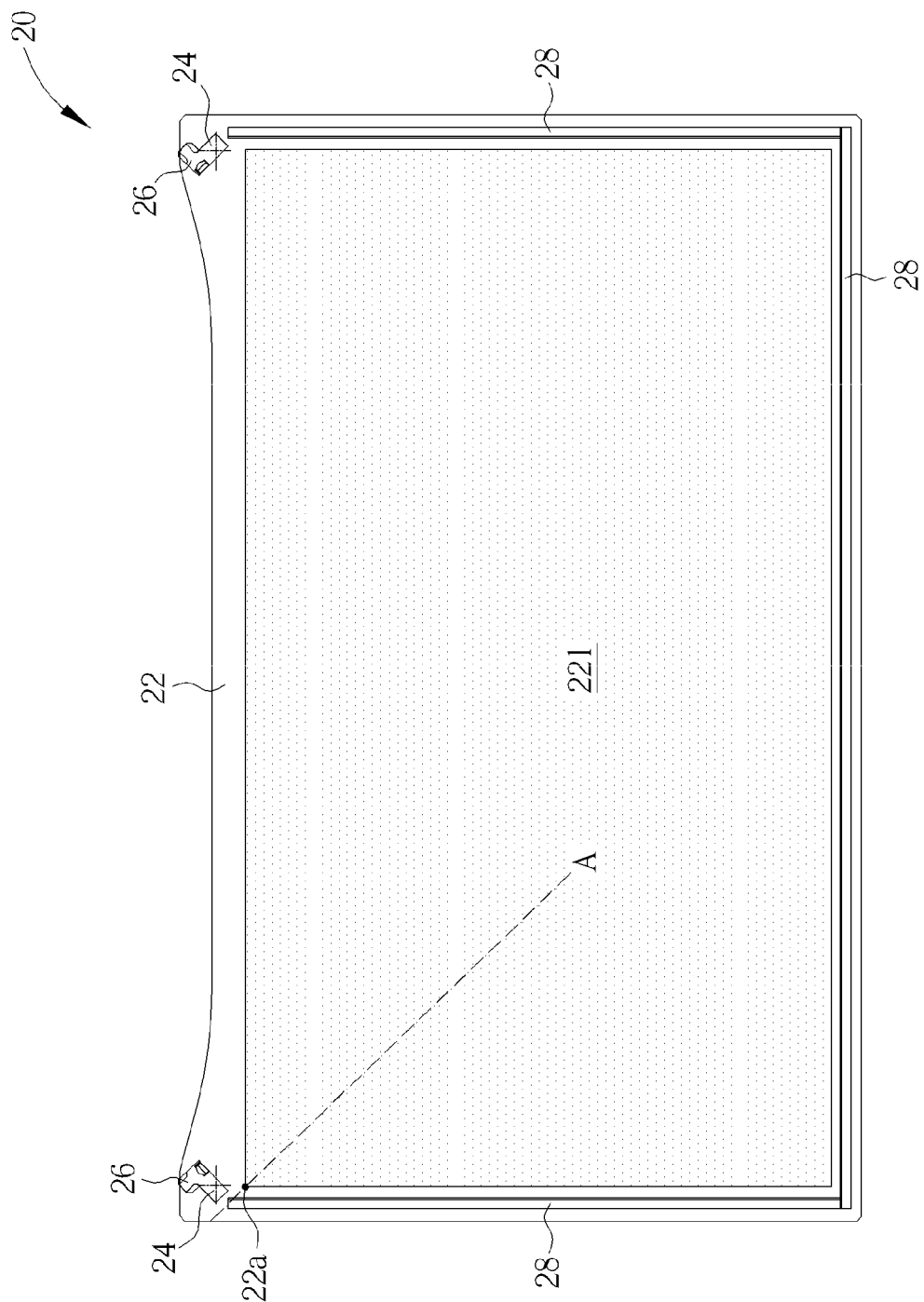
FIG. 2 is a diagram of an optical touch module according to an embodiment of the present invention.

Please refer to FIG. 2. FIG. 2 is a diagram of an optical touch module 20 according to an embodiment of the present invention. The optical touch module 20 includes a panel 22, at least one sensor 24, at least one controller 26, and three bars 28. The bar 28 can be a reflection bar for reflecting or absorbing an optical signal emitted from the sensor 24. The three bars 28 are respectively disposed on three edges of the panel 22, and the edges whereon the bars 28 is disposed are opposite to the sensor 24, so as to execute boundary setting on the panel 22, and to form a detecting area 221 on a surface of the panel 22. When a view range of the sensor 24 covers the detecting area 221, a user can slide figures on the detecting area 221 to actuate an optical touch function. The panel 22 includes a reference line A, and angles between the reference line A and adjacent edges of the panel 22 are respectively 45 degrees, so that an assembly of the sensor 24 can be calibrated via the reference line A.

For product appearance or structural design, the sensor 24 can be disposed by a side of a corner 22a of the panel 22, which means that the sensor 24 is not disposed on an extension of the reference line A. The bars 28 can be disposed on the other edges of the panel 22 opposite to the sensor 24. The sensor 24 can emit the optical signal in a radiation manner. The bar 28 can reflect or absorb the optical signal from the sensor 24, so as to form the detecting area 221 on the surface of the panel 22 by an optical blocking technology. The sensor 24 can capture a varied optical signal that results in an object (such as the figure of the user) put into the detecting area 221, and the controller 26 electrically connected to the sensor 24 can analyze the varied optical signal to determine a coordinates value of the object located inside the detecting area 221.

The optical touch module 20 of the present invention can read and analyze position of the user's figure located inside the detecting area 221, so as to output a corresponding operation command for the optical touch function. An amount of the controller 26 can correspond to an amount of the sensor 24. For example, the optical touch module 20 can include two sensors 24 respectively disposed on two adjacent corners of the panel 22, and two controllers 26 electrically connected to the corresponding sensors 24 respectively.

Figure 3:
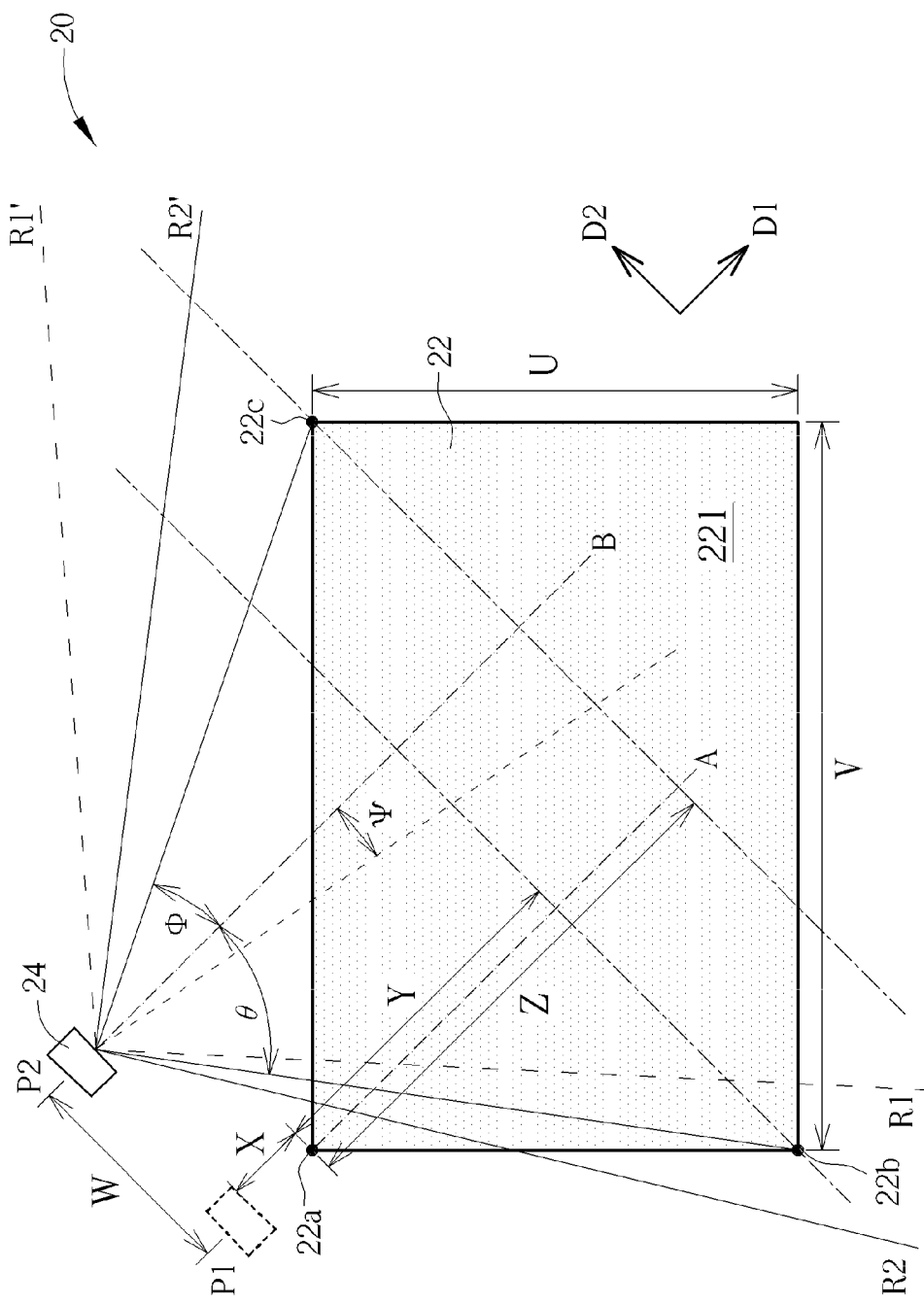
FIG. 3 is a diagram of a horizontal adjustment of the optical touch module according to the embodiment of the present invention.

Please refer to FIG. 2 and FIG. 3. FIG. 3 is a diagram of a horizontal adjustment of the optical touch module 20 according to the embodiment of the present invention. A frame painted by dotted lines is a position of the conventional optical touch machine in the prior art, which means the said position is located at a first position P1 of the corner 22a of the panel 22. The sensor 24 of the optical sensor module 20 of the present invention can be disposed on a position spaced out from the corner 22a of the panel 22 and on the extension of the reference line A, which means the said position is located at a second position P2 by a side of the corner 22a of the panel 22. The sensor 24 of the optical touch module 20 can point toward the detecting area 221 on the panel 22. A movement of the sensor 24 relative to the corner 22a along a first direction D1 can be a first moving distance X, and a movement of the sensor 24 relative to the corner 22a along a second direction D2 can be a second moving distance W.

The first direction D1 can be substantially parallel to the reference line A, and the second direction D2 can be substantially perpendicular to the reference line A. As shown in FIG. 3, when the sensor 24 moves from the first position P1 to the second position P2, an angle between a central line B of the sensor 24 and the reference line A can equal a horizontal rotary angle Ψ according to a first table T1, so that the view range of the sensor 24 can fully cover the whole area (or the detecting area 221) on the panel 22. The central line B can be a reference for equally dividing the view range of the sensor 24.

| The first table T1 | | | |
|---|---|---|---|
| Position | X(mm) | W(mm) | ψ(Degree) |
| 1 | 0.00 | 0.00 | 0.00 |
| 2 | 5.00 | 0.00 | −0.16 |
| 3 | 10.00 | 0.00 | −0.32 |
| 4 | 1.00 | 5.00 | 0.58 |

| The first table T1 | | | |
|---|---|---|---|
| Position | X(mm) | W(mm) | ψ(Degree) |
| 5 | 6.00 | 5.00 | 0.42 |
| 6 | 11.00 | 5.00 | 0.26 |
| 7 | 1.00 | 10.00 | 1.18 |
| 8 | 6.00 | 10.00 | 1.02 |
| 9 | 8.50 | 9.00 | 0.82 |
| 10 | 11.00 | 10.00 | 0.86 |
| 11 | 16.00 | 10.00 | 0.71 |
| 12 | 18.00 | 12.00 | 0.89 |
| 13 | 2.00 | 15.00 | 1.75 |
| 14 | 7.00 | 15.00 | 1.59 |
| 15 | 12.00 | 15.00 | 1.43 |
| 16 | 2.00 | 20.00 | 2.34 |
| 17 | 7.00 | 20.00 | 2.18 |
| 18 | 2.00 | 25.00 | 2.93 |
| 19 | 5.00 | −5.00 | −0.78 |
| 20 | 10.00 | −5.00 | −0.94 |
| 21 | 8.00 | −8.00 | −1.25 |

A plurality of movements of the sensor 24 and values of the horizontal rotary angle Ψ are listed in the first table T1. Each movement of the sensor 24 can correspond to the suitable horizontal rotary angle Ψ. The present invention can adjust the horizontal rotary angle Ψ of the sensor 24 according to the distance of the sensor 24 relative to the corner 22a of the panel 22 and dimensional variation of the panel 22. It is to say, the present invention can utilize a length U of the panel 22, a width V if the panel 22, the first moving distance X and the second moving distance W to generate the first table T1 by calculation. The first table T1 is composed of the first moving distance X, the second moving distance W and the horizontal rotary angle Ψ. The first table T1 of the present invention can further calculate a first projecting distance Y and a second projecting distance Z between the corner 22a and the adjacent corners (22b and 22c) respectively, and a first angle θ and a second angle Φ between the central line B and the adjacent corners (22b and 22c) by the length U, the width V, the first moving distance X and the second moving distance W when the sensor 24 is located at the second position P1 and its central line B is substantially parallel to the reference line A. The horizontal rotary angle Ψ can be calculate by the first angle θ and the second angle Φ, and detailed calculation is introduced as following.

As shown in FIG. 3, dotted lines R1-R1' outputted from the sensor 24 can be the view range of the sensor 24 when the central line B is substantially parallel to the reference line A. Meanwhile, the sensor 24 moves from the first position P1 to the second position P2 without adjustment of the horizontal rotary angle Ψ, so the corner 22b of the panel 22 exceeds over the view range of the sensor 24, and a distance between the corner 22c of the panel 22 and a boundary of the view angle of the sensor 24 remains space. In order to adjust the optical touch module 20 for the best view range of the sensor 24, the sensor 24 of the optical touch module 20 located at the second position P2 can be adjusted about the horizontal rotary angle Ψ. Therefore, the view range of the sensor 24 can be adjusted as a frame R2-R2', the corners 22b and 22c of the panel 22 can be set inside the view range of the sensor 24, and the optical touch module 20 can have the preferred touch detection sensitivity.

Figure 4:
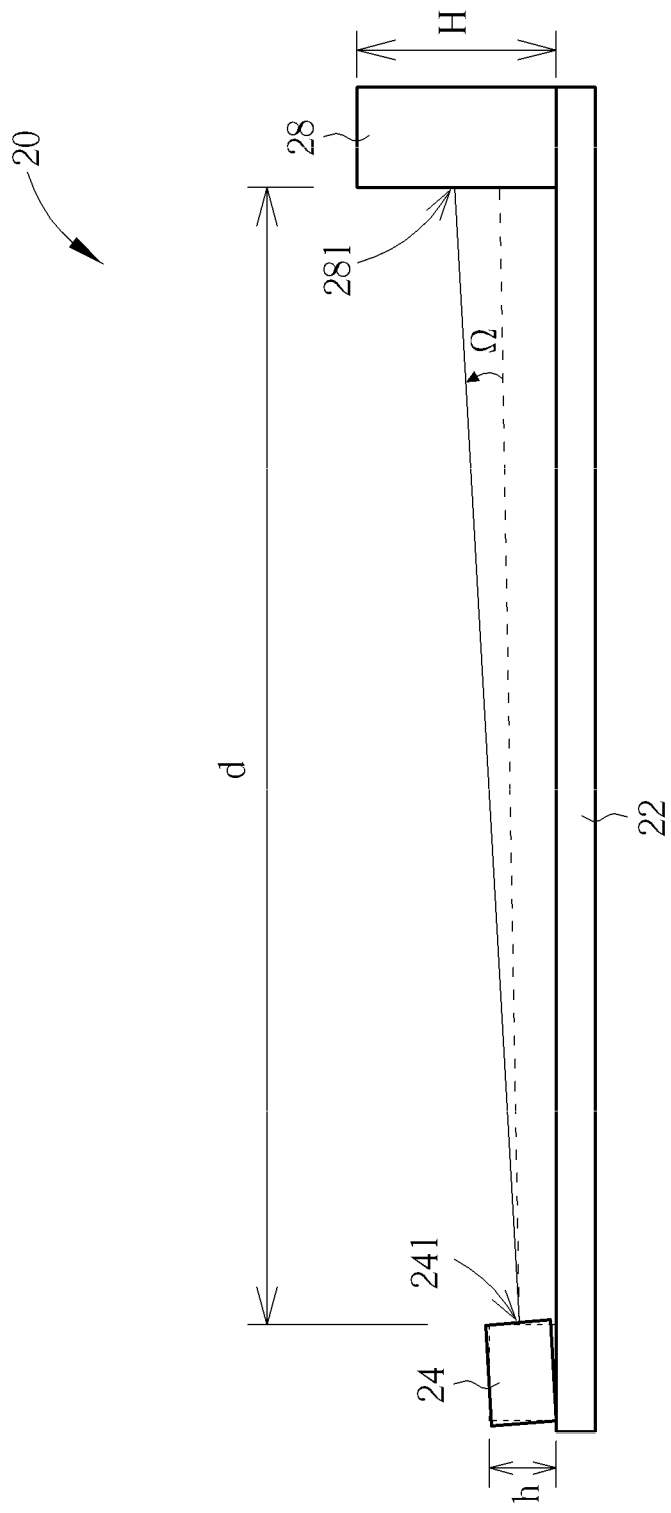
FIG. 4 is a diagram of a vertical adjustment of the optical touch module according to the embodiment of the present invention.

Besides, the optical touch module 20 can further adjust an elevation angle or an inclination angle of the sensor 24 relative to the panel 22 accordingly. Please refer to FIG. 4. FIG. 4 is a diagram of a vertical adjustment of the optical touch module 20 according to the embodiment of the present invention. A frame painted by dotted lines is a position of the sensor 24 before the inclination adjustment or the elevation adjustment of the optical touch module 20. Because a sensor height h of the sensor 24 is usually different from a bar height H of the bar 28, the sensor 24 can be adjusted about a vertical rotary angle Ω (which can be the elevation angle or the inclination angle) according to the sensor height h, the bar height H, and a distance d between the sensor 24 and the bar 28, so as to enhance operation quality of the optical touch module 20.

For example, the optical signal emitted from the sensor 24 crosses over the bar 28 when the elevation angle of the sensor 24 is overlarge, so that the sensor 24 is interfered easily by ambient light to decrease its signal quality. The optical signal emitted from the sensor 4 illuminates the glass substrate of the panel 22 when the inclination angle of the sensor 24 is overlarge, the optical signal can not be absorbed by the bar 28 completely, and dust on the surface of the panel interferes an optical path between the sensor 24 and the bar 28, so that the sensor 24 may detect lots of noise. For obtaining the preferred view range of the sensor 24, the optical touch module 20 of the present invention can adjust the sensor 24 about the vertical rotary angle Ω relative to the panel 22 according to a second table T2.

| The second table T2 | | | |
| --- | --- | --- | --- |
| Position | h(mm) | H(mm) | d(mm) | Ω(Degree) |
| 1 | 3.5 | 4 | 267 | 0.053 |
| 2 | 3.5 | 4 | 347 | 0.041 |
| 3 | 3.5 | 4 | 469 | 0.031 |

Variation of the distance d between the sensor 24 and the bar 28 according to the dimensional variation of the panel 22, and the suitable vertical rotary angle Ω according to the dimensional variation of the panel 22 are listed in the second table T2. The present invention can utilize the sensor height h, the bar height H, the distance d between the sensor 24 and the bar 28, and the other parameters to calculate the elevation angle or the inclination angle for aligning a sensing center 241 of the sensor 24 with a central position 281 of the bar 28, so as to generate the vertical rotary angle Ω of the sensor 24 in the vertical rotary adjustment. The detailed calculation is introduced as following.

Figure 5:
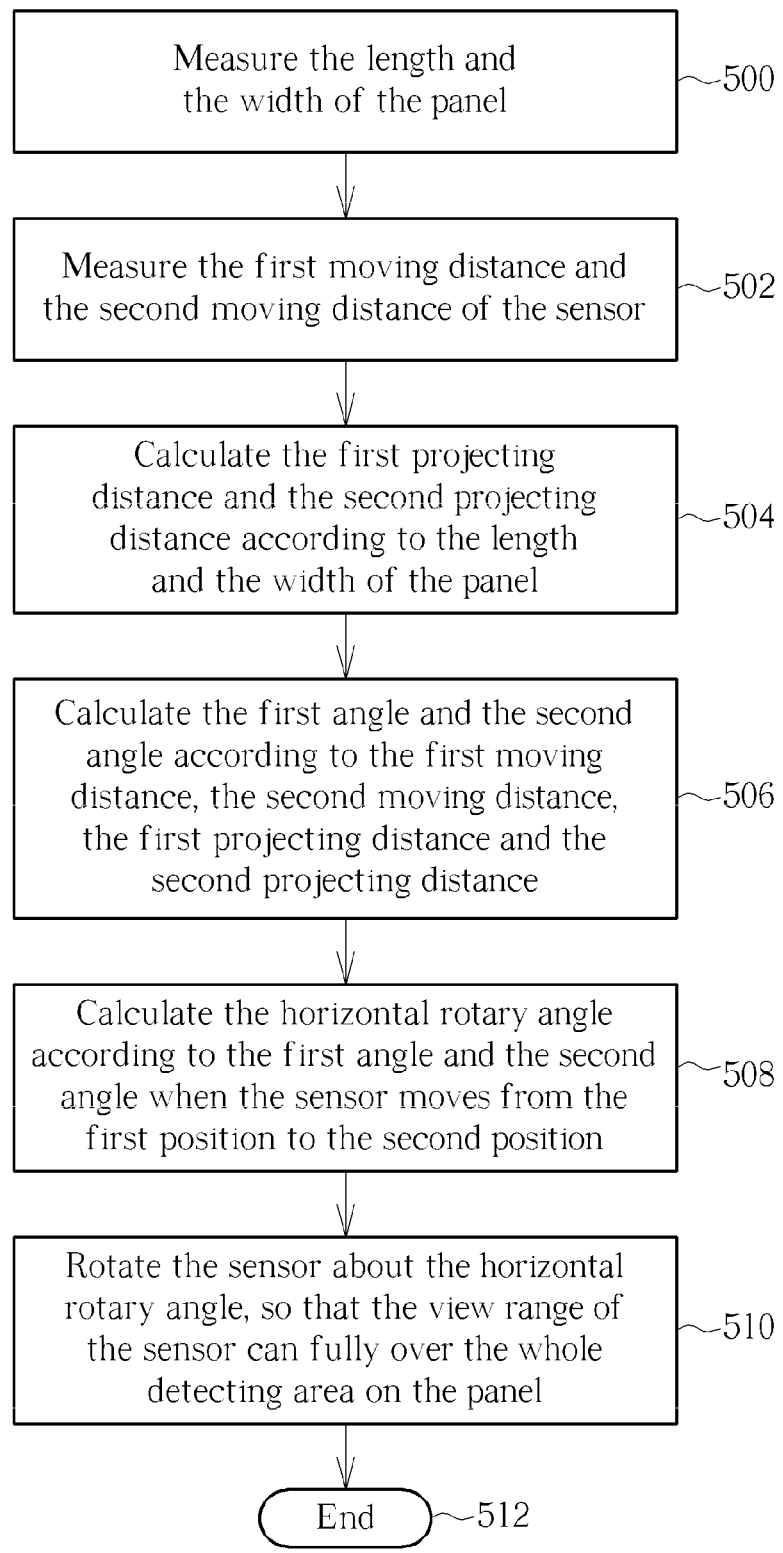
FIG. 5 is a flow chart of adjusting a horizontal rotary angle of a sensor of the optical touch module according to the embodiment of the present invention.

Please refer to FIG. 5. FIG. 5 is a flow chart of adjusting the horizontal rotary angle Ψ of the sensor 24 of the optical touch module 20 according to the embodiment of the present invention. The method includes following steps:

Step 500: Measure the length U and the width V of the panel 22.

Step 502: Measure the first moving distance X along the first direction D1 and the second moving distance W along the second direction D2 when the sensor 24 moves from the first position P1 to the second position P2.

Step 504: Calculate the first projecting distance Y between the sensor 24 located at the first position P1 and the corner 22b of the panel 22, and the second projecting distance Z between the sensor 24 located at the first position P1 and the corner 22c of the panel 22 according to the length U and the width V of the panel 22.

Step 506: Calculate the first angle θ between the sensor 24 located at the second position P2 and the corner 22b of the panel 22, and the second angle Φ between the sensor 24 located at the second position P2 and the corner 22c of the panel 22 according to the first moving distance X, the second moving distance W, the first projecting distance Y and the second projecting distance Z.

Step 508: Calculate the horizontal rotary angle Ψ according to the first angle θ and the second angle Φ when the sensor 24 moves from the first position P1 to the second position P2.

Step 510: Rotate the sensor 24 about the horizontal rotary angle Ψ, so that the view range of the sensor 24 located at the second position P2 can fully over the whole detecting area 221 on the panel 22.

Step 512: End.

At the beginning, the sensor 24 of the optical touch module 20 can be disposed at the first position P1, and angles between the central line B of the sensor 24 and the adjacent edges of the panel 22 can respectively be 45 degrees. When the sensor 24 moves at the second position P2 without rotation, the view range of the sensor 24 does not fully cover the detecting area 221 on the panel 22, the angles between the central line B and the corners 22b, 22c of the panel 22 can respectively be the first angle θ and the second angle Φ. For calculating the correct horizontal rotary angle Ψ, the length U and the width V of the panel 22, the first moving distance X and the second moving distance W of the sensor 24 when moving from the first position P1 to the second position P2 are measured (steps 500 and 502). The above-mentioned values are the four basic parameters of the horizontal rotary angle Ψ for rotary adjustment of the sensor 24 of the optical touch module 20.

After measurement of the length U, the width V, the first moving distance X and the second moving distance W, the length U can be multiplied by [square root over (½)] to generate the first projecting distance Y according to an isosceles right triangle formula, which is formed by the first projecting distance Y and the length U shown in FIG. 3, and the width V can be multiplied by [square root over (½)] to generate the second projecting distance Z according to the isosceles right triangle formula, which is formed by the second projecting distance Z and the width V shown in FIG. 3 (step 504). Then, the first angle θ can be substantially equal to a arctangent angle of a first ratio, and the first ratio substantially equals a sum of adding the first projecting distance Y and the second moving distance W divided by a sum of adding the first moving distance X and the first projecting distance Y. The second angle φ can be substantially equal to the arctangent angle of a second ratio, and the second ratio substantially equals a sum of subtracting the second moving distance W from the second projecting distance Z divided by a sum of adding the first moving distance X and the second projecting distance Z (step 506). Because the view range of the sensor 24 of the optical touch module 20 can not be magnified or reduced during the rotation, the horizontal rotary angle Ψ can be substantially equal to a half of a sum of subtracting the second angle φ from the first angle θ, so that view range of the sensor 24 can fully cover the detecting area 221 on the panel 22 after the sensor 24 is rotated about the horizontal rotary angle Ψ (steps 508 and 510).

Figure 6:
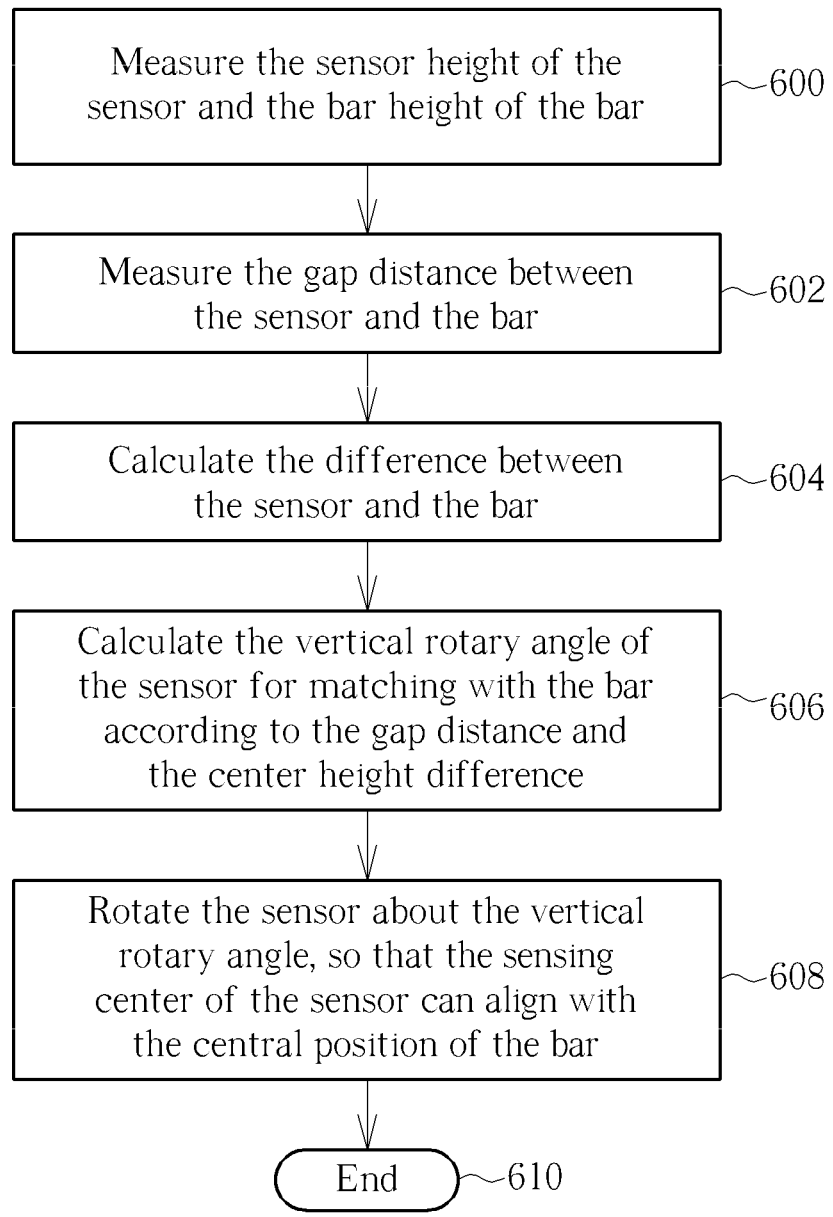
FIG. 6 is a flow chart of adjusting a vertical rotary angle of the sensor of the optical touch module according to the embodiment of the present invention.

Please refer to FIG. 6. FIG. 6 is a flow chart of adjusting the vertical rotary angle Ω of the sensor 24 of the optical touch module 20 according to the embodiment of the present invention. The method includes following steps:

Step 600: Measure the sensor height h of the sensor 24 and the bar height H of the bar 28.

Step 602: Measure the gap distance d between the sensor 24 and the bar 28.

Step 604: Calculate a difference between the sensor 24 and the bar 28.

Step 606: Calculate the vertical rotary angle Ω of the sensor 24 for matching with the bar 28 according to the gap distance d and the difference (a center height difference) between the sensing center 241 of the sensor 24 and the central position 281 of the bar 28.

Step 608: Rotate the sensor 24 about the vertical rotary angle Ω, so that the sensing center 241 of the sensor 24 can align with the central position 281 of the bar 28.

Step 610: End.

The sensor height h of the sensor 24 and the bar height H of the bar 28 can be measured at the beginning, so as to calculate the center height difference between the sensor 24 and the bar 28. The center height difference equals a half of a sum of subtracting the bar height H from the sensor height h. Then, the gap distance d between the sensor 24 and the bar 28 is measured. The gap distance d can be varied according to the dimensional variation of the panel 22, and the gap distance d can substantially equal to a straight length from the sensing center 241 of the sensor 24 to the central position 281 of the bar 28 (steps 600 to 604). The vertical rotary angle Ω calculated by step 606 can be substantially equal to a arctangent angle of a third ratio, and the third ratio substantially equals a sum of dividing the center height difference by the gap distance d, so that the sensor 24 can be rotated about the vertical rotary angle Ω for the vertical adjustment, and the sensing center 241 of the sensor 24 can accurately align with the central position 281 of the bar 28 to finish the rotary adjustment.

In conclusion, the present invention includes the first table T1 and the second Table T2. The user can adjust the horizontal rotary angle Ψ and the vertical rotary angle Ω of the sensor 24 by the moving distance of the sensor 24 (from the first position P1 to the second position P2), the sensor height h of the sensor 24, the bar height H of the bar 28, and the dimension of the panel 22 (the length U, the width V and the gap distance d), so that the sensor 24 of the optical touch module 20 can align with the central position 281 of the bar 28, and the view range of the sensor 24 can fully cover the whole area on the panel 22.

Figure 7:
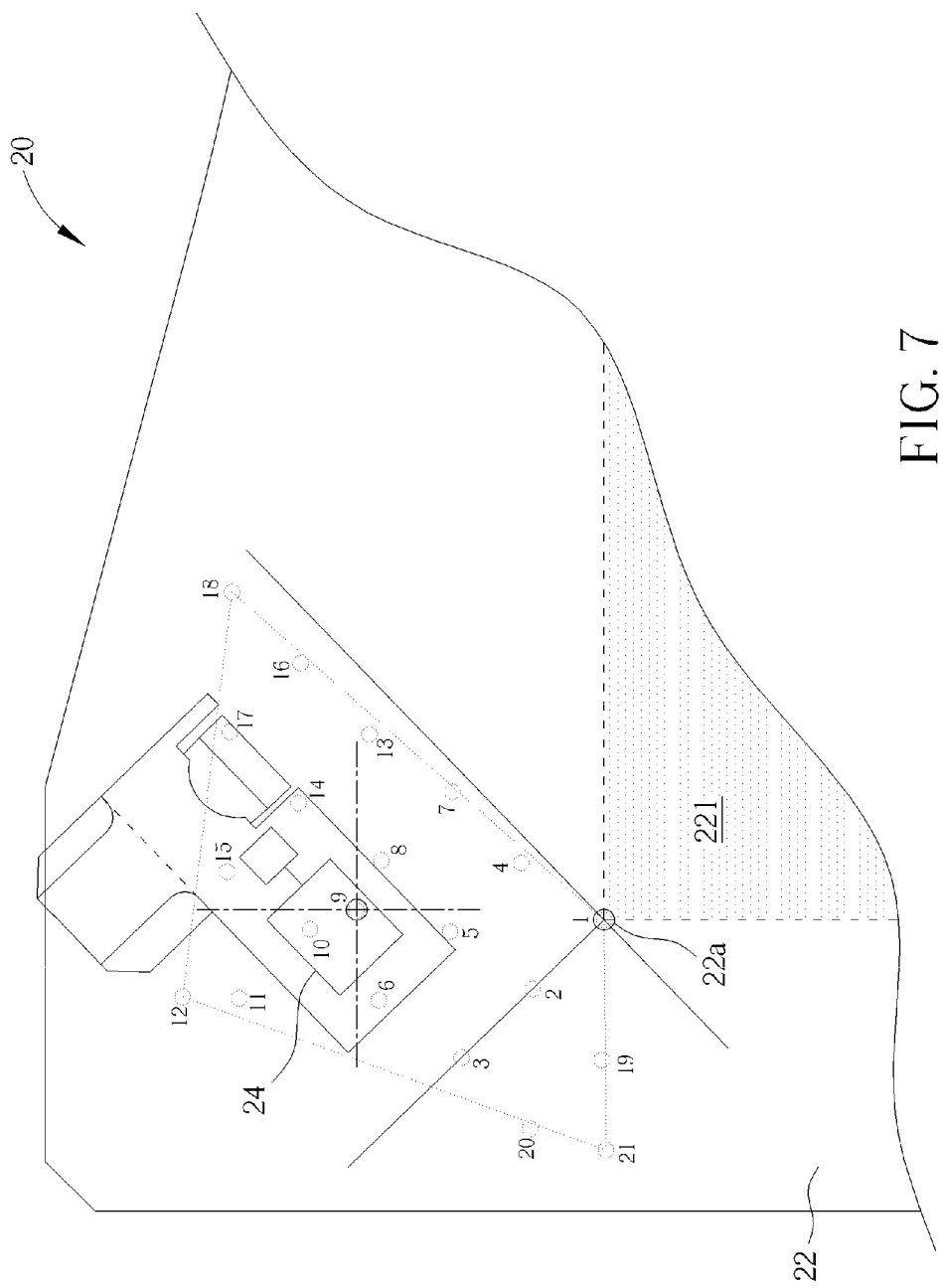
FIG. 7 is a diagram of a movement scope of the sensor with respective to a first table according to the embodiment of the present invention.

Please refer to FIG. 7. FIG. 7 is a diagram of a movement scope of the sensor 24 with respective to the first table T1 according to the embodiment of the present invention. The first table T1 lists 21 reference parameters of movements from the first position P1 to the second position P2 in random. The first reference parameter in the first table T1 can be the adjustment parameter when the sensor 24 is located at the first position P1, as shown in FIG. 7. When the sensing center 241 of the sensor 24 is disposed on the corner 22a of the panel 22 according to the first reference parameter, the vertical rotary angle Ω of the sensor 24 is zero, and the view range of the sensor 24 of the optical touch module 20 at an initial state can fully cover the whole area on the panel 22.

When a position of the sensing center 241 of the sensor 24 relative to the corner 22a is varied according to the other reference parameters (one of the parameters in the first table T1), and the sensor 24 is not rotated about the horizontal rotary angle Ψ for adjustment, the view range R1-R1' of the sensor 24 does not fully cover the detecting area 221 on the panel 22, as shown in FIG. 3. The user can horizontally adjust the sensor 24 according to the horizontal rotary angle Ψ listed in the first table T1, so that the view range R2-R2' of the adjusted sensor 24 can fully cover the whole detecting area 221 on the panel 22. Relation between the reference parameters of the first table T1 and the first position P1 Re indicated shown in FIG. 7. The sensor 24 can move away from the first position P1 and be located at any second position P2 for preferred circuit design or mechanical design. Distance relation between the first position P1 and the second position P2 is not limited to the first table T1 of the above-mentioned embodiment, which means the user can move the sensor 24 to any position relative to the corner 22a of the panel 22 according to design demand.

In the rotary adjustment of the present invention, the horizontal rotary angle Ψ can be calculated by the length U, the width V, the first moving distance X and the second moving distance W according to the above-mentioned method. After the horizontal rotary adjustment, the vertical rotary angle Ω can be further calculated by the sensor height h, the bar height H and the gap distance d according to the above-mentioned method. The first table T1 and the second table T2 both list several common reference parameters for the rotary adjustment, the other unlisted reference parameter can be calculated by the methods shown in FIG. 5 and FIG. 6, and the detailed description is omitted herein for simplicity.

Comparing to the prior art, the present invention includes the method of adjusting the horizontal rotary angle and the vertical rotary angle of the sensor, so as to vary the view range of the sensor which moves away from the initial state. The present invention can utilize the length and the width of the panel, and the moving distances of the sensor to generate the first table, and further utilize the sensor height, the bar height and the gap distance to generate the second table by the above-mentioned horizontal adjustment method and the above-mentioned vertical adjustment method. Therefore, the user can easily adjust the horizontal rotary angle and the vertical rotary angle of the sensor according to the first table and the second table, so that the view range of the sensor of the optical touch module can fully cover the whole area on the panel, to effectively enhance the product quality and the manufacturing yield of the optical touch module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of adjusting a rotary angle of an optical touch module, the optical touch module comprising a sensor and a panel, the method capable of rotary adjusting the sensor which moves relative to the panel from a first position to a second position, the method comprising:

measuring a length and a width of the panel;

measuring a first moving distance and a second moving distance of the sensor when the sensor moves from the first position to the second position, wherein the first moving distance is along a first direction and the second moving distance is along a second direction different from the first direction;

calculating a first projecting distance and a second projecting distance of the sensor according to the length and width of the panel when the sensor is at the first position, wherein the projecting distances is respectively between the first position and adjacent corners of the panel;

calculating a first angle and a second angle of the sensor according to the first moving distance, the second moving distance, the first projecting distance and the second projecting distance when the sensor is at the second position, wherein the angles are respectively between the second position and the adjacent corners of the panel; and calculating the horizontal rotary angle of the sensor when the sensor moves from the first position to the second position according to the first angle and the second angle.

2. The method of claim 1, further comprising:
rotating the sensor about the horizontal rotary angle, so that a view range of the sensor at the second position covers whole area on the panel.

3. The method of claim 1, wherein an angle between a central line of the sensor and an adjacent edge of the panel is substantially equal to 45 degrees when the sensor is at the first position, and the central line is substantially parallel to a reference line of the panel.

4. The method of claim 3, wherein angles between the central line of the sensor and the adjacent corners of the panel are substantially equal to the first angle and the second angle when the sensor is at the second position and is not rotated about the horizontal rotary angle.

5. The method of claim 3, wherein the first direction is substantially parallel to the reference line, and the second direction is substantially perpendicular to the reference line.

6. The method of claim 1, wherein calculating the first projecting distance and the second projecting distance of the sensor at the first position relative to the adjacent corners of the panel comprises:
calculating the first projecting distance and the second projecting distance by respectively dividing the length and the width into $\sqrt{2}$ according to an isosceles right triangle formula.

7. The method of claim 1, wherein the first angle is substantially equal to a arctangent angle of a first ratio, and a sum of adding the first projecting distance and the second moving distance divided by a sum of adding the first moving distance and the first projecting distance substantially equals the first ratio.

8. The method of claim 7, wherein the second angle is substantially equal to a arctangent angle of a second ratio, and a sum of subtracting the second moving distance from the second projecting distance divided by a sum of adding the first moving distance and the second projecting distance substantially equals the second ratio.

9. The method of claim 1, wherein the horizontal rotary angle is substantially equal to a half of a sum of subtracting the second angle from the first angle.

10. The method of claim 1, wherein horizontal rotation of the sensor is adjusted according to a first table composed of the first moving distance, the second moving distance and the horizontal rotary angle.

11. The method of claim 1, further comprising:
measuring a sensor height of the sensor and a bar height of the bar applied to the optical touch module;
measuring a gap distance between the sensor and the bar; and
calculating the vertical rotary angle of the sensor for matching the bar according to the gap distance and a difference between the sensor height and the bar height.

12. The method of claim 11, further comprising:
rotating the sensor about the vertical rotary angle, so that a sensing center of the sensor aligns with a central position of the bar.

13. The method of claim 11, wherein calculating the vertical rotary angle of the sensor for matching the bar comprises:
calculating a difference between a sensing center of the sensor and a central position of the bar.

14. The method of claim 11, wherein the vertical rotary angle is substantially equal to a arctangent angle of a third ratio, and a difference between a sensing center of the sensor and a central position of the bar divided by the gap distance substantially equals the third ratio.

15. The method of claim 11, wherein vertical rotation of the sensor is adjusted according to a second table composed of the sensor height, the bar height, the gap distance and the vertical rotary angle.

16. An optical touch module capable of adjusting rotary angles, the optical touch module comprising:
a panel, a detecting area being set on a surface of the panel, the panel comprising a reference line, an angle between the reference line and an adjacent edge of the panel being substantially equal to 45 degrees;
a sensor disposed by a side of a corner of the panel for capturing an optical signal from an object, an angle between the reference line and a central line of the sensor equaling a horizontal rotary angle according to a first table, an angle between the sensor and the panel equaling a vertical rotary angle according to a second table, so that a view range of the sensor covers whole area on the panel; and
a controller electrically connected to the sensor for determining a coordinates value of the object located inside the detecting area according to the optical signal captured by the sensor.

17. The optical touch module of claim 16, wherein the optical touch module further comprises a bar disposed on an edge of the panel opposite to the sensor, and the bar absorbs or reflects the optical signal from the sensor.

18. The optical touch module of claim 16, wherein the optical touch module further comprises two sensors respectively disposed on by sides of two adjacent corners of the panel, an angle between the reference line and a central line of each sensor is substantially equal to the horizontal rotary angle according to the first table, and an angle between the sensor and the panel is substantially equal to the vertical rotary angle according to the second table.

19. The optical touch module of claim 16, wherein a range of the sensor moving relative to the corner of the panel along a first direction is substantially equal to a first moving distance, a range of the sensor moving relative to the corner of the panel along a second direction is substantially equal to a second moving distance.

20. The optical touch module of claim 19, wherein the first direction is substantially parallel to the reference line, and the second direction is substantially perpendicular to the reference line.

21. The optical touch module of claim 19, wherein the first table is composed of the first moving distance, the second moving distance and the horizontal rotary angle.

22. The optical touch module of claim 16, wherein ranges between the corner of the panel and the other adjacent corners respectively are a first projecting distance and a second projecting distance.

23. The optical touch module of claim 22, wherein the first projecting distance is [square root over (2)] times the length of the panel, the second projecting distance is [square root over (2)] times the width of the panel, angles between the adjacent corners and the central line of the sensor parallel to the reference line respectively are a first angle and a second angle, the first angle is substantially equal to a arctangent angle of a first ratio, a sum of adding the first projecting distance and the second moving distance divided by a sum of adding the first moving distance and the first projecting distance substantially equals the first ratio, the second angle is substantially equal to a arctangent angle of a second ratio, a sum of subtracting the second moving distance from the second projecting distance divided by a sum of adding the first moving distance and the second projecting distance substantially equals the second ratio, and the horizontal rotary angle is substantially equal to a half of a sum of subtracting the second angle from the first angle.

24. The optical touch module of claim 17, wherein a sensing center of the sensor aligns with a central position of the bar.

25. The optical touch module of claim 24, wherein a difference between the sensing center of the sensor and the central position of the bar is 0.5 times a sum of subtracting a bar height of the bar from a sensor height of the sensor, the vertical rotary angle is substantially equal to a arctangent angle of a third ratio, and the difference divided by a gap distance between the sensor and the bar substantially equals the third ratio.

* * * * *